United States Patent [19]

Marschall et al.

[11] Patent Number: 4,937,794
[45] Date of Patent: Jun. 26, 1990

[54] SEISMIC NOISE SUPPRESSION METHOD

[75] Inventors: Richard A. Marschall; John F. Gillooly, Jr., both of Houston, Tex.

[73] Assignee: Western Atlas International, Inc., Houston, Tex.

[21] Appl. No.: 53

[22] Filed: Jan. 2, 1987

Related U.S. Application Data

[63] Continuation of Ser. No. 731,152, May 6, 1985, abandoned.

[51] Int. Cl.$^5$ .............................................. G01V 1/38
[52] U.S. Cl. ........................................ 367/21; 367/74; 367/62; 181/108
[58] Field of Search .................. 367/74, 56, 38, 57, 367/58, 52, 117, 55, 62, 21; 181/108, 111, 112

[56] References Cited

U.S. PATENT DOCUMENTS 4,561,075 12/1985 Smith et al. ........................... 367/46

OTHER PUBLICATIONS

Ursin, Bjorn., "Spatial Filtering of Marine Seismic Data," Geophysics, vol. 48, #12, Dec. 1983.

Primary Examiner—Ian J. Lobo
Attorney, Agent, or Firm—E. Eugene Thigpen; William A. Knox

[57] ABSTRACT

Coherent noise on seismic records is suppressed by reformatting the common shot gathers to common receiver gathers. Pairs of seismic traces from a common receiver gather are corrected for differential normal moveout, weighted in inverse relation to the RMS signal power, and combined to generate compressed common receiver gathers. The compressed common receiver gathers may be reformatted as common midpoint gathers for further processing.

10 Claims, 7 Drawing Sheets

COMMON RECEIVER GATHERS
WEIGHTED, SUMMED AND NORMALIZED

SEISMIC NOISE SUPPRESSION METHOD

This is a continuation of application Ser. No. 731,152 filed May 6, 1985, now abandoned.

BACKGROUND OF THE INVENTION

1. Field of the Invention

This invention is concerned with a method for suppressing extraneous noise from seismic recordings. In particular the method is concerned with suppressing signals due to shots generated by an independently operating seismic exploration crew.

2. Description of the Prior Art

In marine seismic exploration, a seismic ship tows a streamer cable including a plurality of seismic receivers such as hydrophones through a body of water. The streamer cable is generally towed at a desired depth beneath the water surface, such as 10 meters. Generally the streamer cables provide 96 or more data channels and may be three kilometers or more in length. As the ship proceeds along a line of survey, an acoustic source is triggered to produce an impulse at spaced apart intervals of 25 to 50 meters. The acoustic waves from the impulse travel downwardly into the earth beneath the water. The waves are reflected from various earth layers back to the water surface where they are sensed by the receivers, converted to electrical signals as a function of total travel time, and recorded for future processing. A similar course of events takes place during land surveying, except of course, land vehicles replace ships.

Some areas of the world, such as the Gulf of Mexico, are heavily explored so that several seismic ships, working for unrelated operators may be conducting surveys at the same time. The receivers used in seismic streamer cables are quite sensitive as well as being omnidirectional. Any sound that the receiver hydrophones hear is detected and recorded. Thus, the receivers respond not only to an impulse or "shot" generated by their own ship, but may also respond to shots generated or fired by another ship. For any given ship, shots from other ships are necessarily coherent noise interference but generated at time intervals unrelated to those of the impulses of the given ship.

It is known of course, that the energy level of the first, direct water-arrivals from a shot may be 80 to 120 dB higher than the much weaker reflected arrivals that arrive several seconds later. It is also well known that the water volume between the water surface and the sea floor acts as an acoustic wave guide. Because of that phenomenon, the first direct signal arrivals from a ship as far as 50 to 100 kilometers distant may create a serious noise problem for some other ship. The problem of other-ship noise contamination is so serious that the respective operators within a given area allot daily time periods amongst themselves so that each operator can conduct his studies in comparative quiet. Preferably a marine seismic crew operates 24 hours per day to maximize revenue time against fixed overhead. Any involuntary standby time is very costly.

Most classical seismic data processing methods involving noise suppression are based upon the assumption that ambient noise events on any given shot record are random and incoherent. The noise level is reduced by coherent "stacking" or summation after application of various well-known processes of common-midpoint processing and the like.

Other-ship noise is coherent. A single shot from another ship will contaminate all of the traces of an own-ship seismic record. Coherent noise is not amenable to conventional treatment. This disclosure addresses itself to the problem of removing other-ship coherent noise.

SUMMARY OF THE INVENTION

In accordance with a preferred aspect of this invention, a seismic ship successively generates seismic signals at a number of different shot locations along a line of survey. A spread of receivers, towed behind the ship, receive the reflected seismic signals at successively different receiver locations along the line. The respective receiver locations for each shot have a constant offset with respect to the shot locations. The receivers convert the received seismic signals to electrical signals as time-scale traces to form a plurality of common shot gathers. The shot gathers are reformatted as common receiver gathers, thereby reordering traces having coherent noise from some other sound source. The traces of the common receiver gathers are grouped by adjacent pairs. One trace of each pair is corrected for differential normal moveout relative to the other trace of the pair. The two traces of each pair are weighted in inverse proportion to the power of the received seismic signals on each trace and then are combined, such as by summing and normalizing to create a compressed common receiver gather.

In accordance with an aspect of this invention, the compressed common receiver gathers may be reformatted to a common midpoint gather.

In accordance with another aspect of this invention, the step of trace-pair weighting is carried out over a running time window having a preselected length prior to the steps of combining and reformatting.

In another aspect of this invention, the common receiver gathers are grouped as triplets, three traces per group. Differential normal moveout is then applied to two of the traces to correct them to the third trace. Thereafter, the steps of weighting and combining are carried out as before.

BRIEF DESCRIPTION OF THE DRAWINGS

A better understanding of the benefits and advantages of my invention may be obtained from the appended detailed description and the drawings, wherein.

DETAILED DESCRIPTION OF THE PREFERRED EMBODIMENT

Figure 1:
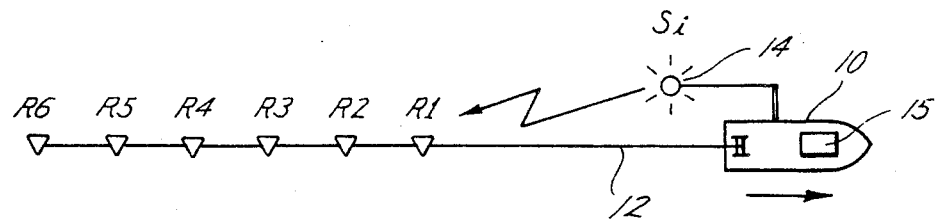
FIG. 1 illustrates a source of coherent noise originating from a rival ship.
Figure 1:
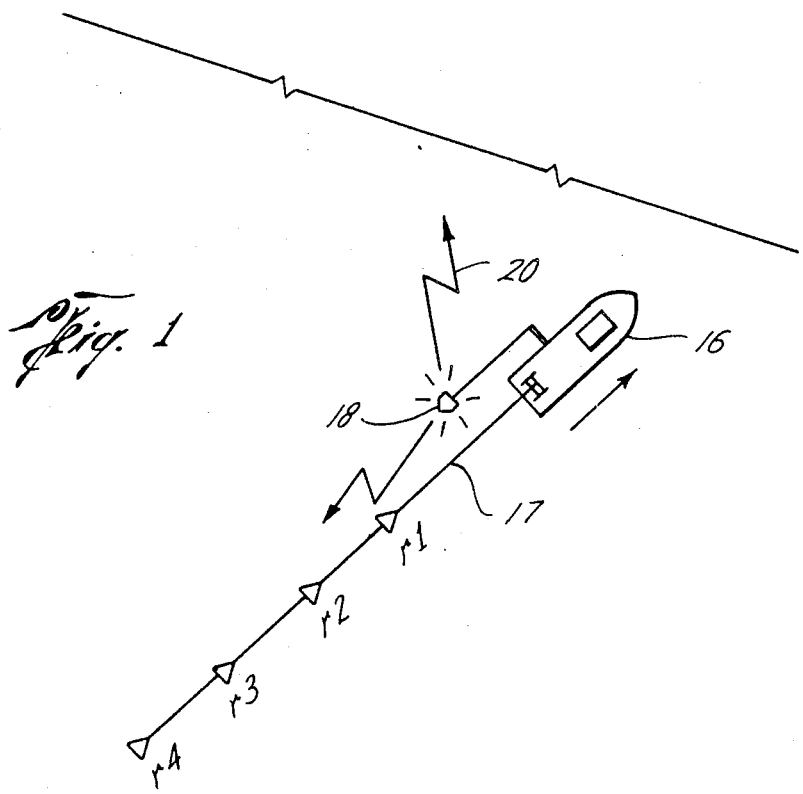

In FIG. 1, there is shown in plan view, a seismic ship 10, towing a streamer cable 12, to which are secured a plurality of seismic signal receivers R1-R6. Six such receivers are shown, but a hundred or more may be used in practice. A receiver array as shown is termed a receiver spread. Typically, the separation between receivers may be about 25 meters. A sound source 14 fires a shot at intervals along the line of survey at shot locations Si (i=1, 2, 3, ..., n)(FIG. 2); the interval between successive shot locations is an integral multiple of the receiver spacing. After each shot, during a listening period of six to eight seconds, the receivers sense seismic signals and convert the seismic signals to electrical signals which are transmitted by a transmission link in cable 12 to a data processor 15 in ship 10. The electrical signals are digitized at convenient sample intervals such as every 2 milliseconds (ms) and are stored for processing.

Another ship 16, which may be many kilometers away, is also towing a seismic cable 17 and receivers such as R1-R4 and a sound source 18. At intervals, ship 16 also fires a shot. The direct water-borne seismic signals 20 may reach receivers R1-R6 during ship 10's listening period to produce a coherent noise burst that interferes with desired signals. Since the operation of ship 16 is independent of the operations of ship 10, coherent noise contamination may occur at regular intervals unrelated to the operations of ship 10.

Figure 2:
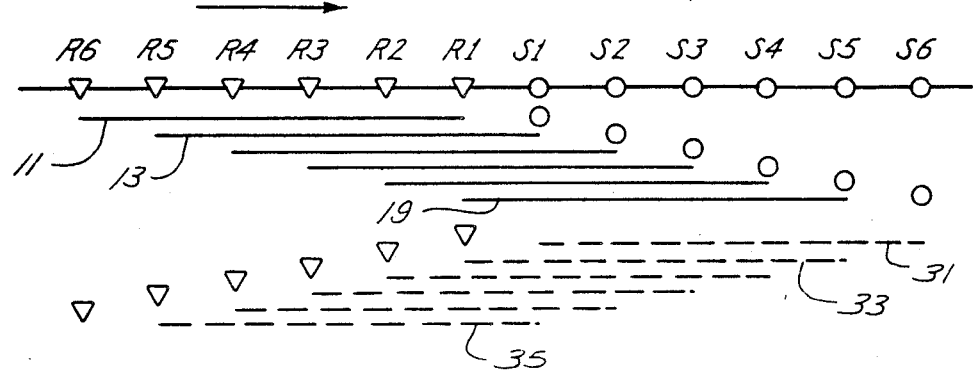
FIG. 2 shows schematically the progress of the surveying ship while engaged in continuous profiling.

FIG. 2 is a plan view of the progress of a continuous seismic profiling operation, beginning at one end of a line of survey. From FIG. 1, we saw that the seismic cable 12 and receivers R1-R6 trail behind ship 10. At a shot location such as S1 the receivers, at receiver locations R1-R6 sense seismic signals over the surface coverage of the receiver spread represented by solid line 11. Observe that the receiver and shot spacings are equal. Customarily there is a gap between the shot location and the first receiver, of several receiver spacings. As ship 10 proceeds to the right along the line of survey to S2 the receiver spread trails along behind so that receivers R1-R6 now occupy locations S1-R5 as shown solid line 13. When the ship reaches S6, the receiver spread R1-R6 occupies surface locations S5-R1, solid line 19. Of course, at each of the shot locations Si, a shot is fired and seismic reflection data are acquired at the corresponding receiver spread location. The significance of the dashed line coverage will be discussed later in connection with FIGS. 6 and 7

Figure 3:
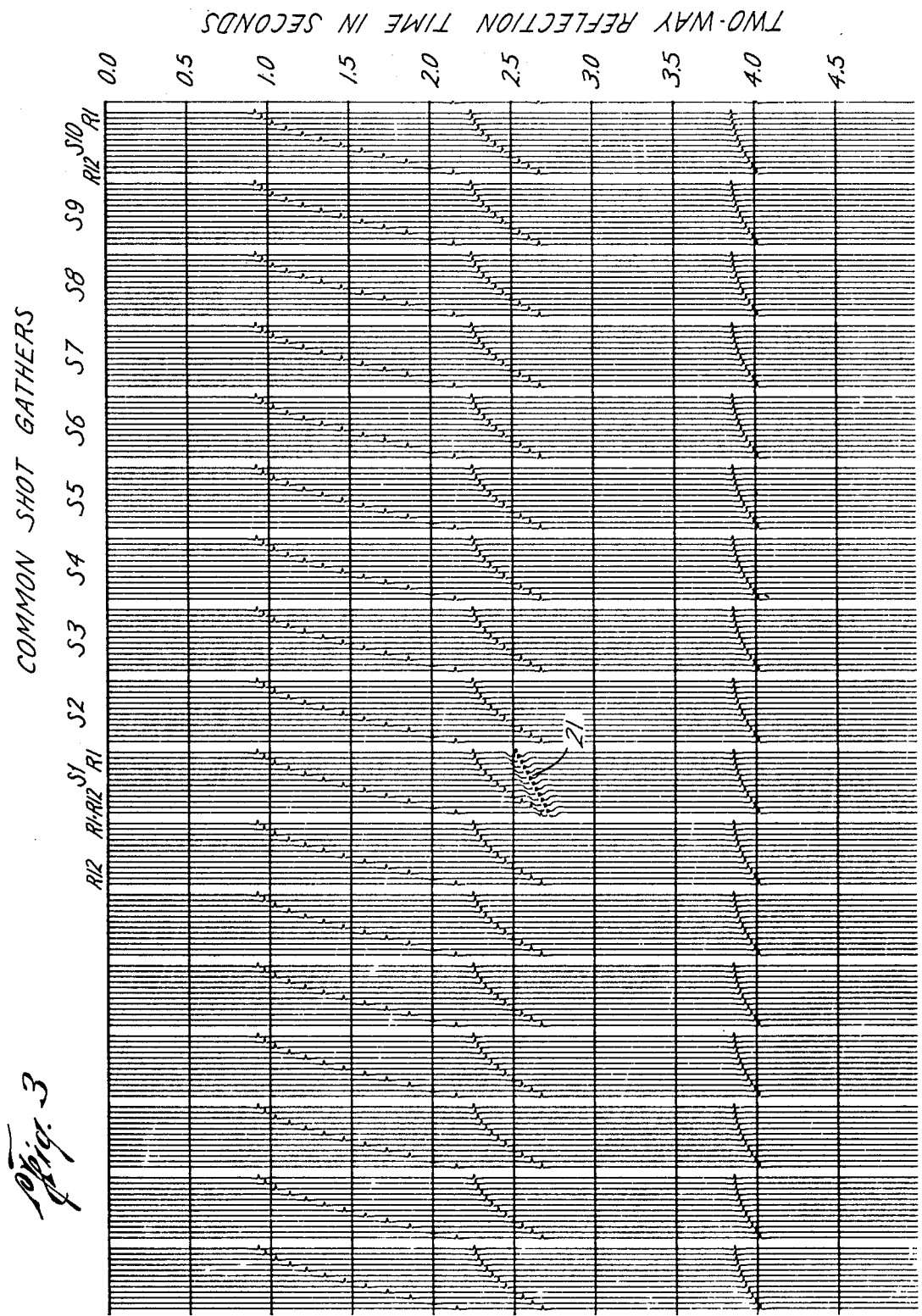
FIG. 3 is a synthetic record section showing a plurality of common shot gathers with a coherent noise burst on one record.

FIG. 3 is a synthetic seismic section of a series of seismic time-scale recordings that happen to have 12 traces per recording that correspond to a 12-receiver spread rather than the oversimplified 6-receiver spread in FIG. 2. Each record constitutes a common shot gather that was shot and recorded from successively different shot locations, S1-S10, (analogous to FIG. 2) and at different times during an operating day. Each record exhibits three reflections having two-way travel times of 0.9, 2.25, and 3.85 seconds, referred to the rightmost trace of each section. The reflections of FIG. 3 are uncorrected for normal moveout (NMO). On record S1, a strong coherent noise burst 21, at 2.55 seconds, cuts across the record, interfering with the reflection at 2.25 seconds. That event is the coherent other-ship noise due to direct, water borne seismic waves, symbolized as 20 in FIG. 1. It is that noise that I wish to eliminate.

A number of the following paragraphs will be largely tutorial for the purpose of defining the principles and terminology used herein.

Figure 4:
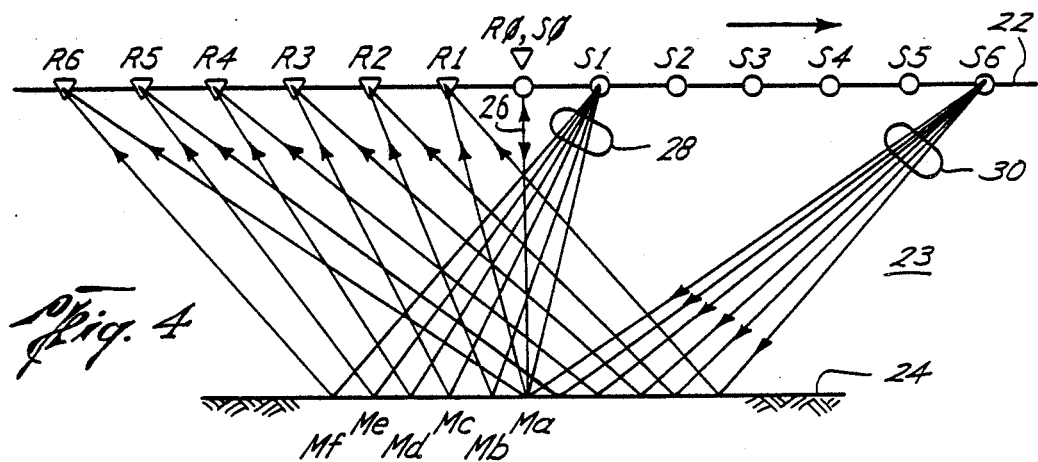
FIG. 4 illustrates seismic ray paths involved in common shot gathers.

FIG. 4 represents schematically an elevational view of seismic-signal ray paths o signal travel paths associated with six successively different shot locations S1-S6 and receiver locations R1-R6. The shot and receiver locations are at or near the surface 22 of a body of water 23 as shown at the upper half of FIG. 2 solid line 11. A sub-bottom earth-layer reflecting surface 24 is shown.

From S1, a seismic signal propagates along a ray path S1-Ma-R1 where it is sensed by R1. Since the signal propagates by spherical spreading from S1, many other ray paths S1-Mb-R2 to S1-Mf-R6 are possible. The respective M's are the ray-path midpoints which, for a 25-meter receiver spacing, are necessarily 12.5 meters apart. Each receiver provides a single time-scale trace on a seismic record as in FIG. 3. As before stated, such a record is said to constitute a common shot gather associated with the bundle of raypaths 28. Other common shot gathers may be constructed for each of the other shot locations S2 to S6, of which only the common shot gather 30 is shown to avoid confusing the drawing.

Supposing that a shot location S0 and a receiver R0 are located at the same position as shown in FIG. 4. The seismic signals travel along a vertical path 26 rather than an oblique path. The depth to the reflector 24 is simply one-half the total signal travel time multiplied by the average velocity of sound through the layered media between reflector 24 and the surface. From the drawing, it is clear that the total travel time along any of the oblique ray paths is longer than the two-way vertical ray path. The difference in total travel time due to angularity is defined as the normal moveout or NMO. NMO is a hyperbolic function proportional to the square of the offset (distance between shot and receiver) and inversely proportional to vertical travel time. The effect of NMO can be seen from the hyperbolic curvature of the respective reflections on the records of FIG. 3. Differential NMO is simply the difference in travel time between any two ray paths.

Figure 5:
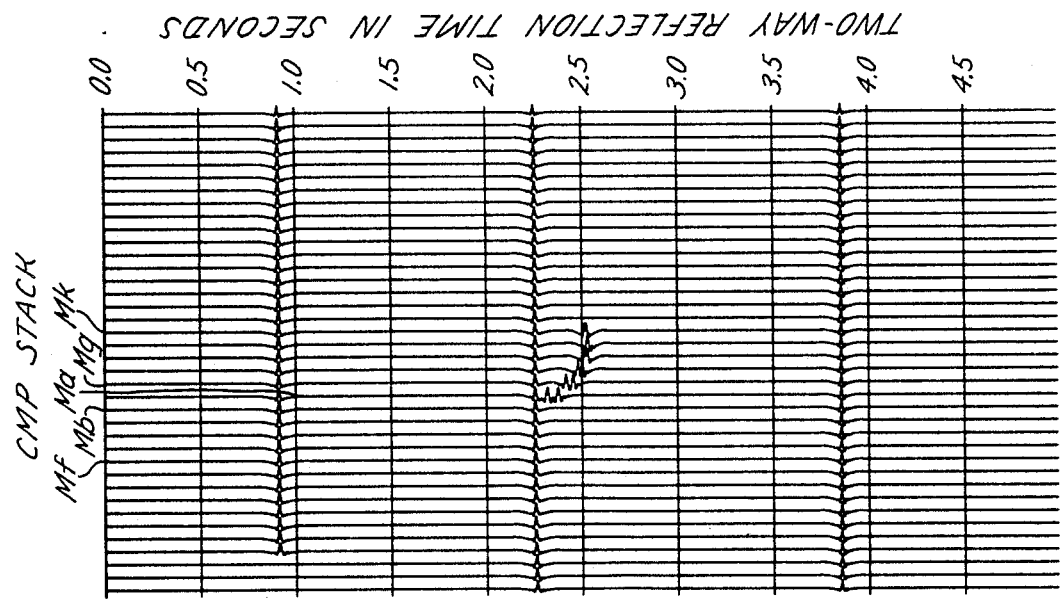
FIG. 5 is an example of a common midpoint stack derived from the common shot gathers of FIG. 3 using conventional processing.

Midpoint Ma is common to ray-paths S1-Ma-R1, S6-Ma-R6, and S0-Ma-R0. If the travel times along the two oblique paths are corrected for NMO, they become equal to the vertical travel time S0-Ma-R0. The resulting three corrected seismic traces can now be summed to produce a three-fold common midpoint (CMP) stack or gather. A CMP gather is quite effective in cancelling random incoherent noise but it is ineffective in cancelling coherent noise. That effect is shown in FIG. 5. The traces of each record of FIG. 5 have been compressed to a six-fold CMP stack. Although most of the traces are clean, the traces involving record S1 are severely contaminated with noise.

Figure 6:
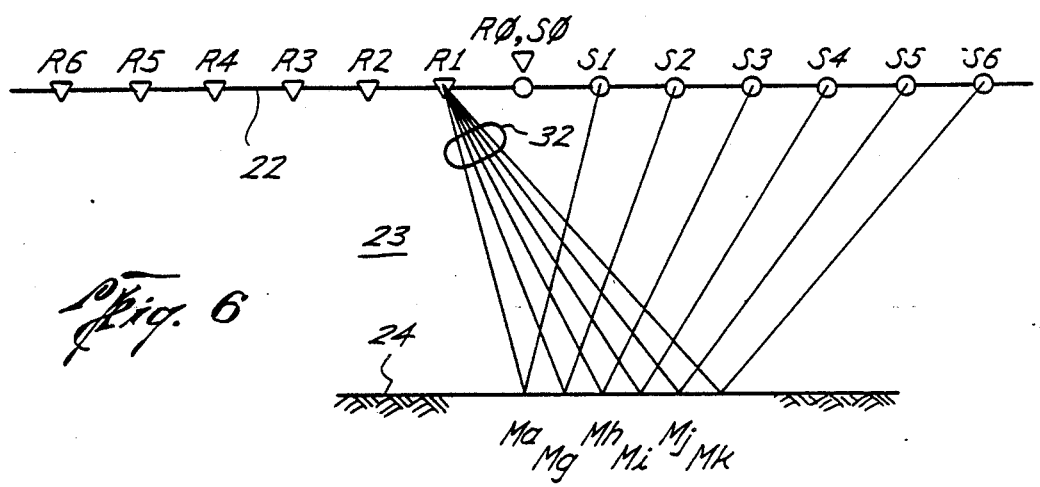
FIG. 6 illustrates the seismic ray paths associated with a common receiver gather at R1.
Figure 7:
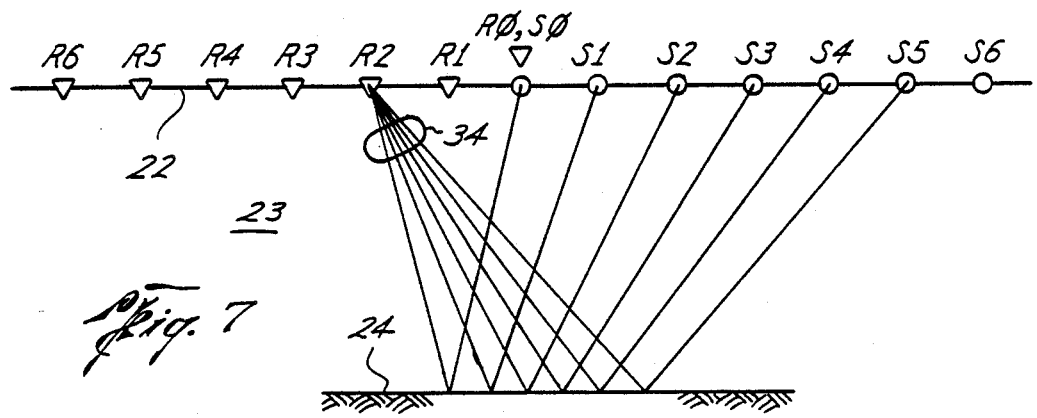
FIG. 7 illustrates the seismic ray paths associated with a common receiver gather at R2.

From FIG. 5, we see that a CMP stack is impotent against coherent noise. I therefore provide a technique to scramble or reorder coherent noise. Refer now to FIG. 6. From FIG. 4, we learned that each receiver senses seismic signals from several different shot locations. For example, R1 receives signals from the successively different shot locations S1–S6 and at successively different points in time. Therefore, it is possible to reformat the common shot gathers to a common receiver gather for R1 as indicated by ray-path bundle 32. Similarly we can produce a common receiver-trace gather 34 for R2, FIG. 7. In FIG. 6, the distance or offset between R1 and S6 is the same as the offset between R2 and S5. The process of interchanging shot location and receiver location is valid because of the well-known reciprocity principle. That is, the signal travel path from S1 to R1, for example is exactly the same as the travel path from R1 to S1.

Referring back to FIG. 2, the dashed lines represent the common receiver gathers that were derived from the common shot gathers shown by the solid lines at the upper portion of FIG. 2. Thus common receiver gather R1 is represented by the surface coverage of dashed line 31, FIG. 2 and ray paths 32 of FIG. 6. Common receiver gather R2 includes the surface coverage of dashed line 33, FIG. 2 and ray paths 34 of FIG. 7. The construction of common receiver gathers continues to R6, dashed line 35, covering shots made at locations R5–S1.

Figure 8:
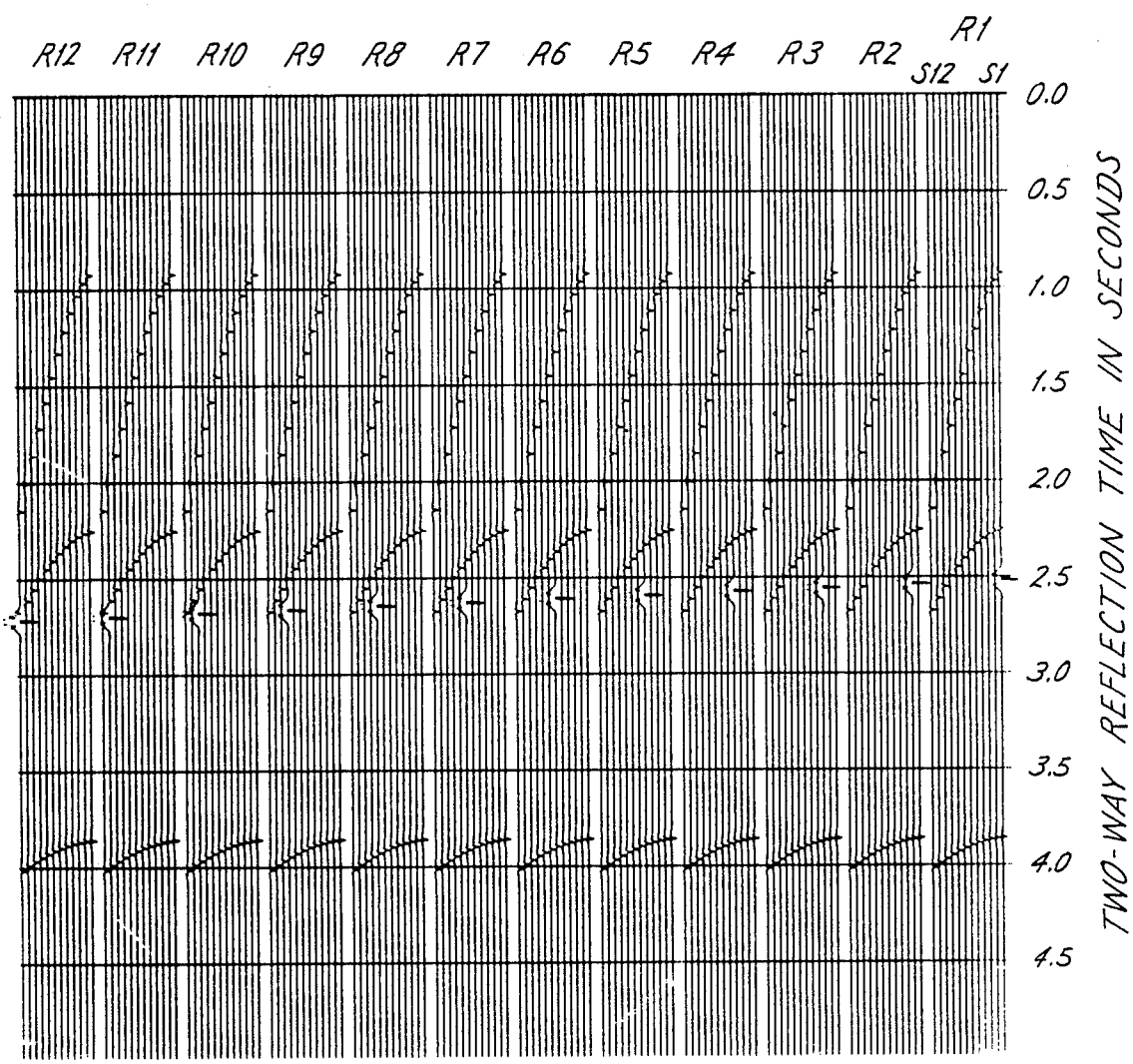
FIG. 8 is a record section of a common receiver gather as reformatted from the common shot gathers of FIG. 3.

FIG. 8 illustrates the common shot gathers of FIG. 3 reformatted as common receiver gathers R1–R12. The coherent noise that contaminated the entire recording of common shot gather S1 has now been redistributed to appear only on one trace of each common receiver gather. Thus, on receiver gather R1, the noise appears on trace 1, the rightmost trace, which corresponds to the first trace of S1. At R2, the noise appears on trace 2 which corresponds to trace 2 of S1 (see also FIGS. 2, 6, 7).

Thus I have produced a series of common receiver-trace gathers wherein the traces having coherent noise have been reordered with respect to their nearest adjacent neighboring traces. I can now use information from the nearest neighboring adjacent trace to repair or replace the noise burst of a contaminated trace.

Figure 9:
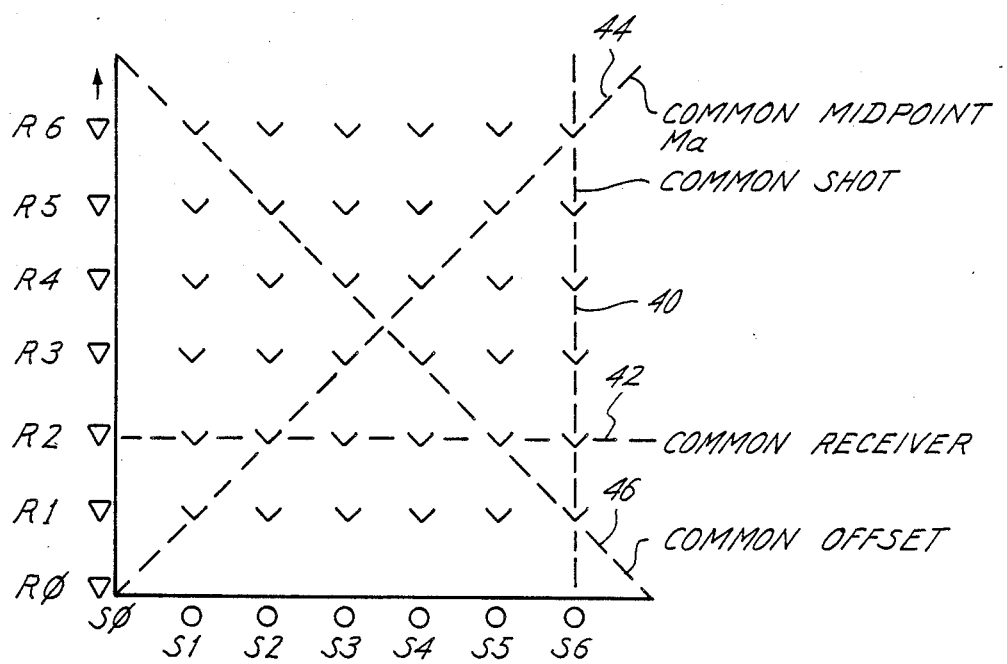
FIG. 9 is a memory matrix suitable for reformatting common shot gathers to common receiver gathers, common midpoint gathers and common offset gathers.

The step of reformatting is most easily carried out by use of an addressable memory matrix. The extent of the matrix in FIG. 9 is limited to a 6×6 array for purposes of example. In practice the extent of the matrix would be expanded to include all possible shot/receiver combinations as required to accommodate the required number of shot locations along the line and receivers along the spread. Refer to FIG. 9. For any given signal travel-time increment, the shot locations are addressed by rows and the receivers associated with any shot location are addressed by columns. Thus for a common shot gather from S6 the signal samples sensed by receivers R1–R6 are stored in memory cells along column S6 as shown by dashed line 40. Common receiver gathers may be constructed by extracting data samples along a row. For example, a common receiver gather for R2 is constructed by extracting data samples from cells along dashed line 42. The data may be reformatted as a CMP gather by extracting data samples from cells lying along any diagonal line parallel to dashed line 44. Thus, a data sample that propagated from S1 to R1 has the same ray-path midpoint Ma as a data sample that propagated from S6 to R6 (refer back to FIG. 4). A diagonal line such as 46 identifies those data samples that propagated along ray paths that have a common shot/receiver offset.

Figure 10:
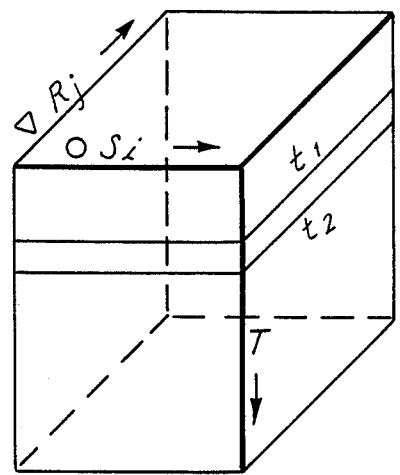
FIG. 10 is the extension of the two-dimensional matrix of FIG. 9 into the time domain.

The matrix of FIG. 9 is two dimensional. Because seismic traces are time-scale recordings, a time axis T, mutually orthogonal to the Si and Rj axes must be added as in FIG. 10. The time axis T may be expressed in terms of incremental sample counts for any given signal-sampling rate. It is convenient to process seismic signals within a time window such as $t_2-t_1$ where the length of the window may be on the order of 150 to 200 ms or 75 to 100 samples at a 2-ms sample rate.

Following the step of reformatting from common shot gathers to common receiver gathers, the traces are grouped by adjacent pairs. For example, referring to FIG. 6, traces corresponding to ray paths R1-Ma-S1 and R1-Mg-S2 form one adjacent-trace pair, R1-Mh-S3 and R1-Mi-S4 form another adjacent-trace pair, and similarly for the other traces. One trace of each pair is then corrected for differential NMO so that the two traces later can be summed. The differential NMO need be only an estimate of the true value. If the reflector 24 does not dip steeply and the subsurface midpoints are close together (12.5 meters), the traces could be grouped by triplets with the estimated differential NMO being applied to two of the traces to correct them to the third trace. For deeper portions of a time-scale recording the differential moveout becomes very small so that differential NMO may be elimated.

Upon completion of the steps of reformatting, grouping, and correcting for differential NMO, the two traces of each pair (or the three traces of each triplet) are weighted in inverse proportion to the RMS signal power level. Any one of a number of known statistical weighting schemes may be used. For example, let $$P(t) = (1/n) \sum_{i=1}^{i=n} A^2{}_i(t),$$

where

P(t) is the signal power level at time t,
$A_i(t)$ is the signal amplitude level at each sample time $t_i$,
i=(1, 2, 3, ..., n) and
n is the number of samples embraced within a selected time window $t_2-t_1$.

Then a time-varying output-trace weighting factor O(t) for a sample within the time window $t_2-t_1$ is $$O(t)=A(t)/P(t).$$

The time-window length is chosen to bracket the coherent noise bursts as seen on the original common shot-trace gather. For the case of FIG. 3, the time window length would be about 200 ms. The weighting factor O(t) is defined over a running time window. That is, successive output-trace weighting factors are determined for successive data samples from a running average of the data samples within that time window $t_2-t_1$ that is centered around the data sample $t_i$ under consideration.

Figure 11:
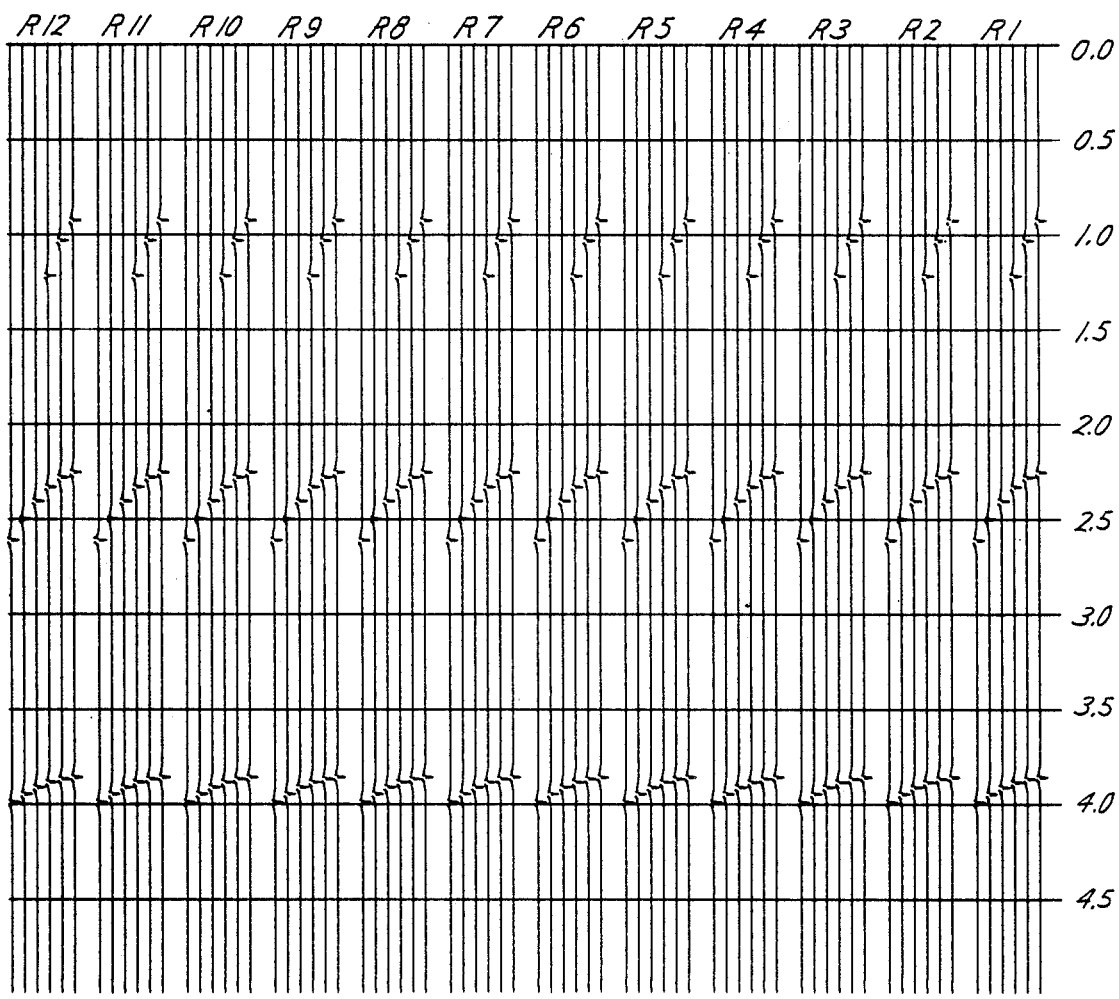
FIG. 11 is a weighted, summed, and compressed common receiver gather created in conformance with the teachings of this invention.

After weighting, the two adjacent traces of each pair are combined, such as by summing and normalizing, to generate a set of twelve, 6-trace, common receiver gathers as shown in FIG. 11, wherein the coherent noise has been successfully suppressed to a level so small as to be insignificant. The shallow reflections at 0.9 second have been muted on the leftmost three traces. For a relatively shallow reflection, the differential NMO is very large. Application of differential NMO severely distorts the waveform such that a valid summation is not possible. Hence the need for muting reflected events for shallow reflections at long offsets. Adjacent-trace summing may be replaced by a running average of two or three traces provided suitable NMO corrections are made.

Figure 12:
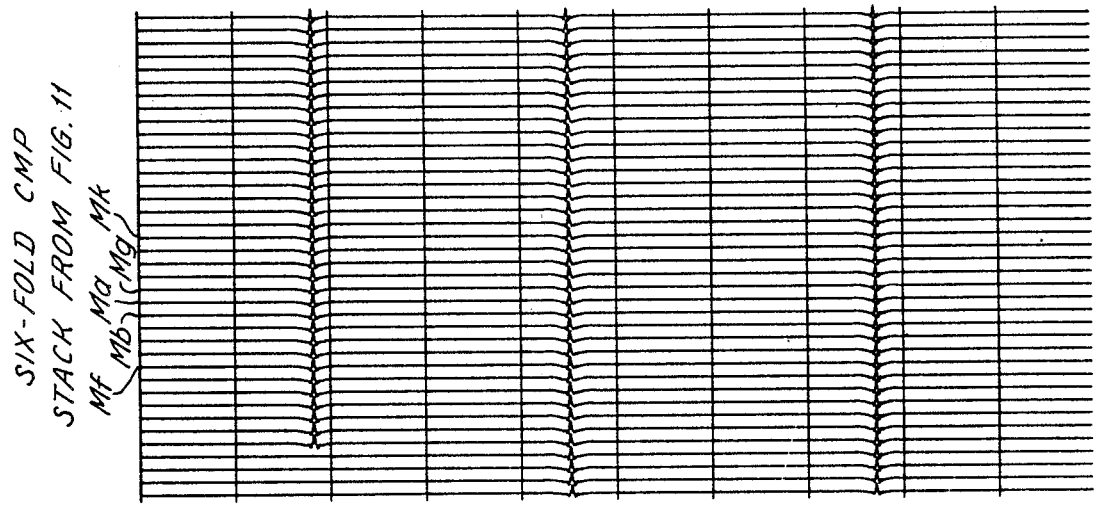
FIG. 12 is common midpoint stack derived from FIG. 11.

The compressed common receiver gathers of FIG. 11 are preferably reformatted and displayed as a visual CMP stacked, time-scale recording as in FIG. 12, preparatory to further conventional data processing. The coherent-noise suppressed CMP stack of FIG. 12, derived from common receiver gathers may be contrasted with the CMP stack of FIG. 5 that was derived from common shot gathers, to appreciate the beneficial results to be had from the practice of my invention. I have thus converted coherent-noise-contaminated raw seismic data into new, coherent-noise suppressed seismic traces.

To summarize the preferred mode of operation then, I suppress coherent noise contamination on seismic data by scrambling or reordering the noise as observed on common shot gathers. Reordering is accomplished by first reformatting the common shot gathers as common receiver gathers. Adjacent traces of the common receiver gathers are grouped by pairs and the required differential NMO is applied to one trace of each pair to correct that trace to the adjacent neighboring trace. A time-varying statistical weighting factor, inversely proportional to the RMS signal power level is applied to the traces. The weighted traces are then combined as by summation and normalization. The summed and normalized adjacent traces may then be reformatted as CMP stacks or in any other format for further processing.

For illustrative purposes, my invention has been described with a certain degree of specificity. Variations will occur to those skilled in the art but which may be included within the scope and spirit of this invention which is limited only by the appended claims. In particular I have used a marine environment for purposes of example but not by way of limitation. My method will function equally well with data acquired on land. The invention has been described with reference to digital data-gathering seismic systems. The method may be easily adapted for use with a pure analog system as well, without departing from the scope of the claims.

I claim as my invention:

1. A method of suppressing coherent noise in marine seismic data detected by a plurality of sensors spaced along a linear sensor array, said seismic data originating from a source which is repeatedly activated as the marine vessel travels through the water, comprising:

recording the seismic signals detected by the detectors of said array as a series of time-scale traces;
   reordering said recorded seismic signals as common receiver gathers;
   dividing said common receiver gathers into subgroups of adjacent traces, weighting the recorded seismic signals in each subgroup in inverse relation to the seismic signal power level, and summing the traces within the subgroups; and
   utilizing said summed traces to form common midpoint stacked sections.

2. The method of claim 1 in which each subgroup consists of two traces.

3. The method of claim 1 in which each subgroup consists of three traces.

4. The method of claim 2 further comprising applying a differential normal moveout correction to one of said two traces.

5. The method of claim 1 further comprising dividing the traces within a subgroup into time windows and weighting the seismic signals within each time window in inverse relation to the seismic signal power level within each said time window.

6. A method of suppressing coherent noise in marine seismic data detected by a plurality of sensors spaced along a linear sensor array, said seismic data originating from a source which is repetitively activated as the marine vessel travels through the water comprising:

recording the seismic signals detected by the detectors as a series of time-scale traces;
   selecting subgroups of the time-scale traces, the traces within each subgroup having been recorded while the detector which detected each trace within the subgroup was at substantially the same location and the source was at a different, successive location for each trace;
   weighting the recorded signals in each subgroup in inverse relation to the seismic signal power level, and summing the traces within the subgroup; and
   utilizing the summed subgroups to form common midpoint stacked sections.

7. The method of claim 6 in which each subgroup consists of two traces.

8. The method of claim 6 in which each subgroup consists of three traces.

9. The method of claim 6 further comprising applying a differential normal moveout correction to said traces.

10. The method of claim 6 further comprising dividing the traces within a subgroup into time windows and weighting the seismic signals within each time window in inverse relation to the seismic signal power level within each said time window.

* * * * *